(12) United States Patent
Brooks et al.

(10) Patent No.: US 10,193,384 B2
(45) Date of Patent: Jan. 29, 2019

(54) SYSTEMS AND METHODS FOR SELECTING GRID ACTIONS TO IMPROVE GRID OUTCOMES

(71) Applicant: 3M INNOVATIVE PROPERTIES COMPANY, St. Paul, MN (US)

(72) Inventors: Brian E. Brooks, St. Paul, MN (US); Gilles J. Benoit, Minneapolis, MN (US); Yang Lu, Singapore (SG)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/541,806

(22) PCT Filed: Jan. 11, 2016

(86) PCT No.: PCT/US2016/012787
§ 371 (c)(1),
(2) Date: Jul. 6, 2017

(87) PCT Pub. No.: WO2016/115002
PCT Pub. Date: Jul. 21, 2016

(65) Prior Publication Data
US 2018/0013320 A1    Jan. 11, 2018

Related U.S. Application Data

(60) Provisional application No. 62/104,196, filed on Jan. 16, 2015.

(51) Int. Cl.
*H02J 13/00* (2006.01)
*G06Q 50/06* (2012.01)
(Continued)

(52) U.S. Cl.
CPC .......... *H02J 13/0006* (2013.01); *G05B 15/02* (2013.01); *G06Q 10/06* (2013.01);
(Continued)

(58) Field of Classification Search
CPC ......... G06Q 50/06; G06Q 10/06; G05B 15/02
See application file for complete search history.

(56) References Cited

U.S. PATENT DOCUMENTS 5,809,493 A * 9/1998 Ahamed ................ G06N 5/025
706/52
7,821,156 B2  10/2010 Katz et al.
(Continued)

FOREIGN PATENT DOCUMENTS

CN      203086231     7/2013
JP      2001290516    10/2001
(Continued)

OTHER PUBLICATIONS

Pasdar, "Detecting and Locating Faulty Nodes in Smart Grids Based on High Frequency Signal Injection," IEEE Transactions on Smart Grid, 2013, vol. 4, No. 2, pp. 1067-1075.
(Continued)

*Primary Examiner* — Vincent H Tran (57) ABSTRACT

Systems and methods for automatically selecting actions to take on a utility grid to simultaneously reduce uncertainty while selecting actions that improve one or more effectiveness metrics. Grid action effects are represented as confidence intervals, the overlap of which is used as a weight when selecting actions within a constrained search space of grid actions. The response of the utility grid to the grid actions may be measured and parsed by the temporal and spatial reach of the grid action, then used to update the confidence intervals for that particular selected grid action.

10 Claims, 4 Drawing Sheets

(51) Int. Cl.
*G06Q 10/06* (2012.01)
*G05B 15/02* (2006.01)
*H02J 3/00* (2006.01)

(52) U.S. Cl.
CPC ............ *G06Q 50/06* (2013.01); *H02J 13/001* (2013.01); *H02J 2003/001* (2013.01); *H02J 2003/007* (2013.01); *Y02E 60/76* (2013.01); *Y04S 10/40* (2013.01); *Y04S 10/525* (2013.01); *Y04S 40/22* (2013.01)

(56) References Cited

U.S. PATENT DOCUMENTS

| | | |
|---|---|---|
| 7,860,615 B2 | 12/2010 | Nelson et al. |
| 7,945,524 B2 | 5/2011 | Anderson et al. |
| 7,991,512 B2 | 8/2011 | Chandra et al. |
| 8,103,388 B2 | 1/2012 | Goodnow et al. |
| 8,121,741 B2 | 2/2012 | Taft et al. |
| 8,234,016 B2 | 7/2012 | Boss et al. |
| 8,494,826 B2 | 7/2013 | Richards et al. |
| 8,504,214 B2 | 8/2013 | Genc et al. |
| 8,509,953 B2 | 8/2013 | Taft |
| 8,571,721 B2 | 10/2013 | Boss et al. |
| 8,583,405 B2 | 11/2013 | Chow et al. |
| 8,589,198 B2 | 11/2013 | McMullin |
| 8,600,572 B2 | 12/2013 | Sri-Jayantha |
| 8,639,392 B2 | 1/2014 | Chassin |
| 2007/0219755 A1 | 9/2007 | Williams et al. |
| 2009/0204267 A1* | 8/2009 | Sustaeta ............ G05B 13/0285 700/291 |
| 2010/0177450 A1 | 7/2010 | Holcomb et al. |
| 2010/0306014 A1 | 12/2010 | Chow |
| 2011/0112987 A1 | 5/2011 | Basak et al. |
| 2011/0125657 A1 | 5/2011 | Boss et al. |
| 2012/0029720 A1 | 2/2012 | Cherian et al. |
| 2012/0179301 A1 | 7/2012 | Aivaliotis et al. |
| 2012/0290104 A1* | 11/2012 | Holt ....................... G06Q 10/00 700/29 |
| 2012/0316691 A1* | 12/2012 | Boardman ................. H02J 3/26 700/293 |
| 2012/0316697 A1 | 12/2012 | Boardman et al. |
| 2013/0066481 A1 | 3/2013 | Bhageria et al. |
| 2013/0077367 A1 | 3/2013 | Zhu et al. |
| 2013/0138482 A1 | 5/2013 | Anderson et al. |
| 2013/0191052 A1 | 7/2013 | Fernandez et al. |
| 2013/0191320 A1 | 7/2013 | Avritzer et al. |
| 2013/0204557 A1 | 8/2013 | Trudnowski et al. |
| 2013/0232094 A1 | 9/2013 | Anderson et al. |
| 2013/0268131 A1 | 10/2013 | Venayagamoorthy et al. |
| 2014/0032187 A1 | 1/2014 | Legbedji et al. |
| 2014/0148962 A1 | 5/2014 | Venayagamoorthy |
| 2014/0172503 A1 | 6/2014 | Hammerstrom et al. |
| 2014/0207837 A1* | 7/2014 | Taniguchi ................. G06N 5/02 708/207 |
| 2014/0358828 A1* | 12/2014 | Phillipps .............. G06N 99/005 706/12 |
| 2015/0039177 A1* | 2/2015 | Chapman ................ G07C 5/008 701/31.6 |

FOREIGN PATENT DOCUMENTS

| | | |
|---|---|---|
| JP | 2005269744 A | 9/2005 |
| JP | 2006202226 | 8/2006 |
| JP | 2014021555 | 2/2014 |
| WO | WO 2012/093518 | 7/2012 |
| WO | WO 2014/087539 | 1/2017 |

OTHER PUBLICATIONS

Pierre, "Probing Signal Design for Power System Identification," IEEE Transactions on Power Systems, 2010, vol. 25 No. 2 pp. 835-843.

International Search report for PCT International Application No. PCT/US2016/012787 dated Apr. 25, 2016, 3 pages.

* cited by examiner

SYSTEMS AND METHODS FOR SELECTING GRID ACTIONS TO IMPROVE GRID OUTCOMES

CROSS REFERENCE TO RELATED APPLICATIONS

This application is a national stage filing under 35 U.S.C. 371 of PCT/US2016/012787, filed Jan. 11, 2016, which claims the benefit of U.S. Provisional Application No. 62/104,196, filed Jan. 16, 2016, the disclosures of which are incorporated by reference in their entireties herein.

BACKGROUND

The ultimate goal of smart grid efforts for utility grids including electrical, water, and gas distribution networks is to enable continuous, real-time, automated optimization of grid conditions to promote goals such as improving efficiency, integrating renwable sources into generation, localizing and characterizing faults, routing utilities around faults to reduce risk and losses, effectively dispatching limited maintenance personnel and resources to potential grid pathologies and other such goals. However, these efforts have been constrained by the grid intelligence possible through current data aggregation and analysis schemes. These schemes take time to produce grid intelligence which is based on correlations, a level of knowledge that may be insufficient to fully achieve automated, real-time optimization pursuing multiple grid goals, and may struggle to identify relationships between particular grid actions or events and any temporally and/or spatially distant effects of those actions or events.

Current big-data modeling approaches to grid intelligence also yield conclusions that may not be readily actionable given the currently existing points of control over the grid, and that are based only on correlations, which include uncertainty that is not precisely computable and results from potential third variables driving observed relationships, and uncertainty about the directionality of those relationships. This uncertainty frequently requires expert humans in the loop to further interpret the observed relationships to develop plans of action, precluding real-time optimization. By capturing and processing the data separate from control of the grid operations, current approaches can achieve only abstract understandings of the links between grid controls and optimal grid conditions. Active machine learning techniques lack perfect experimental controls, remaining susceptible to uncertainty arising from third variable and directionality problems.

Real-time multi-objective optimization requires current, causal knowledge about the specific effects of control decisions, in order to allow for the inherent trade-offs in utility grid operations to be made appropriately. There is a need for the ability to generate control-centered causal knowledge of the effects of controls and latent independent variables affecting the grid, and automatically, continuously, and in real-time, apply that knowledge to driving desirable grid conditions and promoting safety and efficiency while detecting and mitigating grid faults.

SUMMARY OF THE INVENTION

Embodiments of the invention are directed towards generating and exploiting causal knowledge of the effects of grid operational decisions on grid conditions, to improve one or more grid effectiveness metrics, by receiving a search space, calculating the experimental units based on temporal and spatial uncertainty, identifying opportunities for active control, selecting control states for those opportunities in an at least partially randomized manner, collecting data collected on the impact of those control decisions during the experimental units, and updating a knowledge database of the overall impact of control decisions on the utility grid using the collected data.

DETAILED DESCRIPTION OF VARIOUS EMBODIMENTS

Utility grid operations involve numerous individual control and queuing decisions, which often vary over relatively wide operational ranges. Adding control and coordination to those individual control decisions enables experimentation within the current operational envelope of the utility grid, which enables the building of causal knowledge of grid responses to the control decisions. This allows the controls to automatically respond to grid incidents, develop data supporting future grid capital planning including sensor and component additions and replacements, and audits and verifies the improvements that the experimentation and optimization system provides through supervising grid operations. The experimentation may include adaptive experimental protocols to address the trade-off between exploration and exploitation present in current machine-learning based approaches to utilities grid management.

Figure 1:
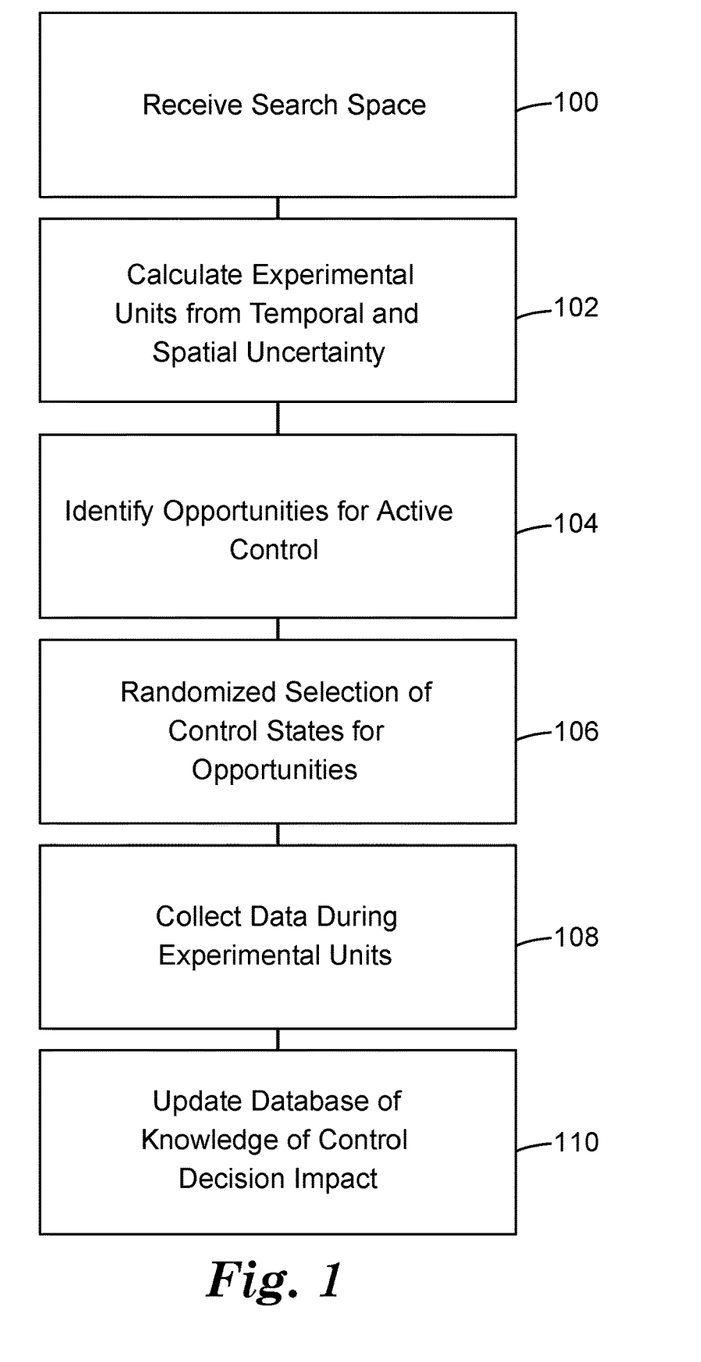
FIG. 1 is a flowchart of a method for determining the effectiveness of grid actions and selecting effective grid actions.

FIG. 1 is a flowchart of a method example of the invention. The search space is received 100, temporal and spatial uncertainty is used to calculate experimental units 102, opportunities for active control are identified 104, control states are selected in a randomized manner for those opportunities 106, data is collected on the impact of those control decisions at least during the experimental unit 108, and collected data from the experimental unit is used to update a knowledge database of the overall impact of control decisions on the utility grid in step 110.

The search space is received in step 100. The search space is the grid controls available for active control by the system, which may be constrained to ensure that active control does not take the grid out of its ordinary operational envelope, or to ensure that dangerous conditions or combinations of conditions are not created by active manipulation of the grid control states. Preferably, the search space is a multidimensional space where each available control is a dimension, with multiple discrete points representing the possible states of that control. The search space may be determined by, for example, indexing the available grid controls and their states, reducing any continuous control states into a finite set of discrete points, then using analytical techniques such as machine learning applied to historical grid operational data to create a search space representative of only grid control states and combinations thereof occurring during the ordinary operations of the grid in the historical operational data used. The search space represents the possible grid control states and combinations thereof that may be selected and implemented according to this example method to adjust the operations of the grid to conduct experiments, develop knowledge and/or pursue improvements in grid conditions and operations. Combinations of grid control states may offer more powerful or precise control of grid parameters than possible through manipulation of single controls at a time.

Grid controls may also have sub-properties associated with them in addition to the possible control states. These associations may be made by storing the sub-properties as metadata, or adding these as dimensions to particular controls. These sub-properties may include frequency of modifying a particular control; these may be treated as independent variables for experiments within the system, for example using the same control in several identified opportunities, but varying the frequency with which the control is activated in different opportunities assigned to testing the effects of that control. In this example, the control is selected, but the variations selected to apply to identified opportunities to vary are not different levels of the control itself, but differing levels of the associated sub-property. Sub-properties that are continuous may be assigned to discrete levels through binning specific ranges of continuous variables to particular points in Euclidian space, and/or determining from power analysis the number of levels that may be powerfully tested and using that number of levels to create discrete points to be tested within the continuous range. Sub-properties may also be included in experimental designs alongside the states of the controls themselves, by selecting both a control state and a sub-property state, through using factorial experimental design to assign the relative frequencies of assignment of the control and sub-property states to opportunities to experiment that are identified for that control.

In some embodiments, the grid controls may include the scheduling and/or prioritization of human-in-the-loop grid actions, such as maintenance, investigation, and repair tasks in addition to or in place of automated grid controls directly acting on elements of the grid. In these cases, these controls are applied to the system through automated scheduling of the tasks and allocation of the resources, and the queue orders or instructions that direct the human-in-the-loop grid actions and are communicated to dispatchers or grid maintenance personnel through automated messages such as emails, text messages, or similar communications. The control may be represented within the search space as a dimension as with other grid controls, with points corresponding to different prioritization values which may be used in building queues, or time periods within which the human-in-the-loop grid actions are to be carried out, and in some cases with a point representing a "do nothing" option where resources are not directed to carry out the human-in-the-loop action.

Temporal and spatial uncertainty data is used to construct experimental units in step 102. The temporal and spatial uncertainties are the temporal and spatial regions near a change in grid controls, over which the effects of that change may observably occur. An example of a temporal uncertainty period on an electrical grid is the period of time it takes for lagging impacts of grid controls that drive current increases in power lines to change the temperature, and thus sag levels of power lines experiencing that increase in current. An example of a spatial uncertainty area on a power grid is a control increasing current flow in lines, and the area over which lines will exhibit changes in their temperature and thus sag behavior based on proximity to the control and the flow of that increased current through the grid. These uncertainty values may be general for the grid, or may be particular to the manipulation of certain controls to more precisely align with the differences in uncertainties associated with different controls which may have significant differences in the possible or likely lagging or wide-area effects of those controls. The uncertainties may be determined through mining past data using machine learning techniques to identify connections between grid controls and correlated responses, and identifying periods and areas where the responses are observed, or may be determined through modeling of grid response using component models, or may themselves be determined through experimentation by driving particular grid actions and observing the measured grid responses to identify the periods of time and areas of space that are as small as possible while capturing a sufficient amount of the grid's response to a grid control. The amount of response captured within a spatial and/or temporal uncertainty period may be expressed as a confidence interval that the time and/or space includes the response; for example, machine learning approaches to determining uncertainties may identify the amount of time or region of space over which there is 95% or 99% confidence that lagging/wide area effects will occur within the time/space. From this uncertainty data, experimental units can be constructed to ensure that when controls are varied, that data can be collected without that data being confounded by other variations in controls being performed in adjacent times and spaces, producing lagging and/or wide-area effects that interfere with the collection of data associated with the selected variation of the grid controls. The experimental unit defines an area of space and a period of time surrounding a grid control, so that when that grid control is altered as part of a trial of the effects of the grid control on grid parameters and conditions, other trials may be prevented from occurring if their experimental units overlap the experimental unit and thus potentially confounding data collected during the trial. Experimental units may cover less than the entire spatial scope of the grid itself. The time component of experimental units also ensure that one trial will not confound subsequent trials, by ensuring that effects are captured within the data collection period and thus allowing potential carryover effects to clear out before another trial may be performed.

Trials involving combinatorics of controls may have their experimental units determined by, for example, taking the largest area and longest period of time associated with any of the controls in the combinatoric trial, or experimental units may be computed individually for each point in the search space, where the points in the search space represent particular combinations of grid control states. The uncertainty values and experimental units may be computed similarly, with machine learning applied to historical data to discover results associated with the particular combination of controls instead of just one control, and determining the time and area over which effects may be observed, or modeling the composite effect of the controls on the grid model, or conducting experiments where the combination of controls is implemented while varying the time and/or space over which associated data is collected, and using this information to set periods over which to observe for the effects of the selected combination of controls on the grid, and to exclude other control selections that may confound the particular trial of that combination of controls.

The spatial and temporal uncertainty data may itself be discovered through experimentation by varying grid control states and observing the effects of that variance over differing periods of time, treating different levels of the spatial and/or temporal uncertainty as independent variables in an experiment. In these experiments, the controls that are changed are the ones whose particular temporal and spatial uncertainties are desired to be better understood. In these experiments, the dependent variable is the extent of change in the grid, as compared to a baseline change value, determined by trials with larger spatial and temporal uncertainty values that have been selected to ensure observation of the entire change value resulting from the grid action whose uncertainties are being tested, to be used as the baseline. When the observed change within the experimental spatial and/or temporal uncertainty deviates from the baseline value by an amount exceeding a significance threshold, that indicates that effects are being missed, or larger portions of the data collection are being influenced by confounds. The significance threshold may be computed using confidence intervals established by standards or tolerances for the particular variables being controlled and monitored. Spatial and/or temporal uncertainty may be selected at the point where divergence from the baseline crosses the significance threshold, to provide the smallest uncertainty periods and areas and thus maximize the number of experimental opportunities, while still providing valid samples that capture lagging effects and avoid significant confound issues.

One example of a trial design to discover spatial and temporal uncertainties, is by closely following a first control action with a second control action at the same location or within a known or likely spatial uncertainty for that control action, and slowly increasing the delay between the two control state changes until a duration is found where the first action does not effect on the system response to the second more than a particular significance threshold, to determine a temporal uncertainty for the first control action. Spatial uncertainties may be found similarly by switching the nearest controls, then incrementally selecting controls further out to be switched instead, until the spatial distance is discovered where the spatially proximate actions do not affect the system response to one another beyond the significance threshold.

Optionally, initial values for the uncertainties may be derived from analysis of previously collected historical data on grid actions and responses, for example by applying principal component analysis with time as a component to produce estimates of the temporal and spatial uncertainties associated with grid controls. Alternatively, a purely empirical approach may be used, based only data collected from experiments without this use of prior data. Initial uncertainty values may also be obtained through human-in-the-loop input, which may take the form of human predictions of the uncertainty values or that may provide outer boundaries for such experimentation, for example a maximum possible temporal uncertainty to confine the experimental discovery of that temporal uncertainty's value, to restrict the search space that will be explored. Optionally, uncertainty values may be computed from computation based on the system components and physics of their operation.

Optionally, temporal and spatial uncertainties may have multiple values, which correspond to different external conditions such as time of day, ambient temperatures or internal conditions such as the state of other grid elements and combinations thereof, or the presence or absence of nearby faults, conditioned which may affect the spatial and/or temporal area affected by a particular grid action. These conditions may, for example, be stored as metadata for the uncertainty values that associates particular values for the uncertainties with particular conditions, and the metadata used to select among the different possible values by matching the selected uncertainty values to the conditions to which those values apply. The conditions may be referenced when determining opportunities or constructing experimental units, by using, for example where the condition is daypart, a system clock to determine the daypart, or in another example using data from the grid sensors indicative of relevant condition values, and comparing those condition values to the metadata for the uncertainties to select the appropriate uncertainty values for the time and/or conditions.

Optionally, additional variables in addition to temporal and spatial uncertainty can be used to construct and coordinate the experimental units. Attributes such as grid parameters affected by the controls can be characterized by observing which parameters are or are not influenced by prior trials of the control, and associated with a particular variation in grid controls, for example as metadata. Those attributes may be combined with the temporal and spatial uncertainties to coordinate experiments across the grid by using overlap among spatial and temporal uncertainties and overlap in some or all additional variables to determine where grid controls may be varied while preventing the variations from confounding ongoing or concurrent experiments also affecting those additional variables sharing temporal and spatial areas with the experiment. For example, additional variables associated with grid control changes could include which grid parameters are affected by that particular control change, such as available power, power quality, and line temperature on an electrical grid. A control change that affects power quality and available power could be excluded from temporal and spatial uncertainties associated with control changes which also affect power quality, to prevent the effects on power quality from confounding one another, while a control change affecting only line temperature, or line temperature and power quality without effects on available power, could be permitted to have its spatial and temporal uncertainties overlap the spatial and temporal uncertainties of a control change that only affects available power, as only unrelated metrics are being affected by each of the control changes, despite sharing some or all of their temporal and spatial uncertainty regions.

Experimental units may also have latent variables associated with them. They may be associated, in some examples, as metadata describing the experimental unit. Latent variables are data representative of particular detected conditions affecting the experimental unit and having possible or expected impacts on the grid, for example, current conditions within an experimental unit such as ambient temperature in that time and location. Latent variables may be detected by sensors placed along the grid and updated dynamically as the conditions change for an experimental unit, and the latent variables at the time of assignment of controls to an experimental unit are associated with that particular experimental unit.

This approach may be used to detect resonance and periodic effects occurring on grids, as well as lagging effects or spatial uncertainty and determine uncertainty areas, and account for such effects in the experimental units and recognition of opportunities to introduce variance, through varying the temporal uncertainty for a given control change and observing the effects of the different time periods on the data observed. Varying the duration of a temporal uncertainty period can allow periodic or resonant effects to emerge by showing differences as the temporal uncertainty increases relative to the frequency of those periodic or resonant effects. Fourier or wavelet analysis of observed differences between varying temporal uncertainties and lengths of experimental units may be used to determine the existence of harmonic or periodic effects.

Opportunities to vary a control state are identified in step 104. Opportunities to vary a control state exist where there are multiple viable alternatives present within the search space, based on that search space, the current grid conditions, and the presence of experimental units from other trials and how they mesh with the experimental units for a potential opportunity. The varying of controls provides opportunities to add trials to experiment on the effects of grid controls or combinations of grid controls on grid response, in terms of either grid parameters directly, or the output of an objective function that combines multiple grid parameters. Objective functions may be non-linear, bounded, and/or discontinuous to reflect grid parameters that must remain within particular ranges, or where the impact of that grid parameter on overall grid performance is subject to particular tipping points or nonlinearities. The existence of an opportunity to vary grid controls may be determined by receiving grid conditions, receiving any experimental unit data for already on-going trials of various control states, surveying the search space to identify members of the search space where the changes made to the control state do not overlap any existing experimental units in space and time and that for the detected current grid conditions, the control states that may be selected are within the normal operational envelope of the grid. Preventing overlap in time and space with other experimental units ensures that those ongoing trials are not confounded by a new trial, and that a new trial is not subject to carryover effects from the ongoing trials.

The control states may also be filtered by the current level of knowledge regarding their effects and a computation of the extent to which those effects drive an objective function output for the current grid conditions, to remove the possibility of selecting strictly inferior control states. This may be done, for examples where knowledge of control effectiveness is stored as means and confidence intervals by computing the objective function for the ranges of the confidence intervals for each possible control state, and identifying only possible control states which have ranges of predicted objective function output that overlaps the range of the possible control state whose range includes the highest range of predicted objective function output.

An objective function may be used to combine and weight the desired grid conditions and outcomes to produce a control effectiveness score by generating a value for a set of measured grid parameters, for example on electrical grids, an objective function may have terms relating to the available power, the amount of power being provided by renewable sources such as solar or wind, and the fidelity of the voltage sine wave to an ideal 60 hZ. The objective function allows diverse grid goals to be pursued simultaneously and manage trade-offs among those grid goals, such as degradation of power quality as more renewable sources are utilized on an example electrical grid. The objective function may be used to predict the extent to which selected grid controls will promote grid goals, or to determine the overall effectiveness of those grid controls when applied to collected grid parameter data associated with a particular variation in one or more grid control states.

Control states are assigned to opportunities to vary in step 106. The assignment of the control states is a selection of one of the possible control states or combinations of control states that may be assigned to the opportunity identified in step 104, and may optionally include assignment of sub-variables associated with the selected control state or combination of control state, including variance of the spatial and temporal uncertainties used to create an experimental unit for the selected control state or combination. The assignment follows principles of experimental design, treating each opportunity identified in step 104 as a trial of an experiment comparing the effectiveness of the possible grid control states identified in that step. The selection may be randomized; the randomization may be wholly stochastic among the possible control states for a given opportunity, or the randomization may be constrained to implement other experimental design principles and/or to effect adaptive experimentation or balance exploration with exploitation of the knowledge of grid control effects that emerges from numerous trials across the grid over time.

Examples of experimental design principles that may be implemented in the control state assignment process of step 106 include balancing, counter-balancing and blocking. Balancing is ensuring that all control state combinations being examined have the same number of observations, meaning that they are selected an equal number of times. This may be done, for example, by identifying a set of opportunities to vary according to step 104 and making selections for the set of opportunities simultaneously with equal quantities of each variation of control states. Counter-balancing is adjusting the order of consecutive variations of grid control states to ensure that each possible order of applying control states is represented, to account for potential effects of varying the order in which those control states are applied to the grid. Counter-balancing may also be done by identifying multiple opportunities in step 104 and composing a counter-balanced set of grid control states to apply across that set of opportunities. Counter-balancing may also be partially implemented by dynamically weighting the frequency of the selection of control states based on the order of past selections and the numbers of instances of the various possible orders in the trials already run. Blocking is the arrangement of experimental groups by similarity; this similarity may be identified as part of the opportunity identification step 104, based on the location and the grid conditions for a given opportunity, and similarity calculated for those opportunities to form blocks or sub-groups or to assign opportunities to already-existing blocks or sub-groups of similar opportunities. The trials can then be balanced, counterbalanced and/or randomized within those sub-groups to ensure a proper range of grid control selections within the block or sub-group.

Selection of control states for opportunities may be weighted or controlled to streamline the experimentation process, by applying adaptive experimentation principles to quickly drop less-promising possible control states and focus on testing control states more likely to improve grid operations. In addition to streamlining experiments, weighting or control of assignment may also be done to balance exploration of the search space and trials to discover the effectiveness of particular grid control states with exploitation of the current level of knowledge of the effects of those grid control states. Weighting or controlling the selection of control states for an opportunity may be done at the opportunity identification step 104 by only considering variations with overlapping predicted objective outputs based on the means and confidence intervals of their impacts, or may be done at the selection stage by predicting the objective outputs and using those in the selection stage, for example by probability matching or by having minimum threshold likelihoods for producing the highest objective output, and selecting stochastically from only among the possible control states above that threshold.

Approaches that weigh the randomization of control state assignments to opportunities may be continuously active, or may be active only when knowledge surpasses certain thresholds. These thresholds may be set by the user and may be based on factors such as, for example, the width of the confidence intervals, or the difference in likelihoods of particular control states being optimal for given grid conditions according to an objective function.

In one specific example of adjusting the randomization of selection of grid control states in step 106 for opportunities identified in step 104, probability matching is used to determine the chances of various control states being selected for that opportunity. In this example, the application of probability matching is first determined by using the point estimates and confidence intervals of impact of the control states along with the current grid conditions and the objective function to compute the likelihood that each of the 3 potential control states in this example are likely to produce the highest output on the objective function. The overlap of the confidence intervals around the point estimates for each potential control state represent the range where those control states may be superior to others for producing the highest objective function output and therefore the most preferred conditions on the grid when the controls are implemented. The probabilities computed here are compared to a threshold value which is used to determine when to probability match as opposed to using purely stochastic randomization among the potential control states, the threshold being the differences in the probabilities. In this example, potential control state A has a 65% chance of best promoting the objective output, potential control state B has a 25% chance of best promoting the objective output, and potential control state C has a 10% chance of best promoting the objective output. Because of the very likely superiority of potential control state A compared to the others, this exceeds the threshold required to conduct probability matching. The probabilities used first to test the threshold are then used to determine the likelihood that each control state will be selected for that opportunity and implemented on the grid in the time and location of the opportunity. For this example, this means that the selection process has a 65% chance to assign potential control state A to the opportunity, a 25% chance to assign potential control state B to the opportunity, and a 10% chance to assign potential control state C to the opportunity. This ensures that each potential control state has a chance to be implemented on the grid and provide an additional trial of that potential control state to refine knowledge of the control state effects, while weighting the selections to increase the likelihood that the decision made is one that best promotes the output of the objective function and thus drives the most desirable conditions and outcomes for the grid when the control state is implemented on the grid.

The experimental designs implemented by the selection of grid control states or delay periods for identified opportunities to experiment may include complex designs, such as factorial experiments to test combinations of adjustable variables (such as combinations of particular control states) and/or sub-variables (such as frequency of switches) and Latin Square and Partial Latin Square designs to test for effects resulting from the particular order in which grid actions are taken. These experimental designs may be implemented by, for example, having a multi-stage selection process, where one independent variable for that opportunity is determined, and the likelihoods of selection of other variables or sub-variables in factorial designs, and subsequent selections in Partial and full Latin Square designs are dynamically updated to increase the likelihood of selection for particular combinations in a factorial design, or to increase the likelihood that a particular order is tested to provide a sample in accordance with a Partial Latin Square design.

The assignment of content to an opportunity may also be influenced by the latent variables associated with an experimental unit where an opportunity exists and to which grid controls are being assigned. The latent variable data may be used to assign an opportunity to a particular set of selection criteria, for example for clustering opportunities existing in like conditions, or to test the effects of particular responses under varying conditions indicated by the associated latent variables. Effectiveness data particular to the latent variables present in a given experimental unit may also be used to particularly determine the probabilities that particular control decisions are likely to be superior, and the means and confidence intervals specific to the latent variable conditions may be used to influence the selection.

The impact of selected control states are measured in step 108. Measurement is done by sensors placed along the grid measuring various grid parameters such as, for example, pressures on gas grids, flow rates on water grids, or the quality of the voltage waveform on electrical power grids. Measurements may be reported by the sensors in terms of those grid parameters on calibrated sensors, or may be reported as raw sensor output waveforms for analysis by automated experimental calibration and interpretation systems. The data is collected within the experimental unit for the control states assigned to the experimental opportunity, as that is the period and area within which the effects of the assigned control states may be observed without confounds. Optionally, the sensor monitoring may be continuous and/or grid-wide, with the data points recorded during experimental units binned to those particular experimental units.

The measurements are used to update knowledge of grid response to control actions in step 110. The knowledge of grid response to control actions is a measure of how a particular control state or set of control states affects grid parameters, which may be measured by the sensors along the grid that collect grid parameter data as the control states are varied. The knowledge of grid response may be stored as a database of point estimates and confidence intervals for each of the points in the search space representing a set of possible grid control states. The knowledge may be kept in terms of the grid parameters themselves, or optionally may be kept in terms of the outputs of objective functions that represent grid goals composed of multiple ranges or preferred values for measured grid parameters. For knowledge of grid response stored as means and confidence intervals, the mean may be updated by adding the results observed in the current trial (the data collected within the experimental unit for that assigned control state or set of states) as a sample to the group of observations used to calculating the mean and computing the new mean with the additional new data point, and confidence intervals may be updated by incrementing the sample size based on the number of trials being added to the data set, and computing updated confidence intervals using the updated sample size including the new trial or trials being added to the data set. The means and confidence intervals may be updated iteratively, adding sample after sample to build the knowledge database.

Systems and methods of the invention may, in some examples, isolate the effects of a particular grid action from a complex background of other grid actions and responses, including isolating the grid action's spatial and/or temporal uncertainties, its effects on grid parameters, or its sub-properties by applying the method of subtraction. The method of subtraction may be applied by determining a baseline grid parameters for the ongoing behavior of the grid, based on the other grid actions and responses ordinarily ongoing, and subtracting those baseline grid parameters from the grid parameter measurements occurring during the experimental unit for a particular selected grid action to isolate the effects of that grid action on the grid parameters being measured. This baseline may be determined from an aggregate of the sensor data over time of the sensors measuring the grid parameters within a certain period and stored in memory, and may be further parsed by particular controls that are also within the control or knowledge of the system or may be regularly updated through baseline periods where controls are assigned to opportunities stochastically.

Where latent variables are associated with experimental units, those latent variables may also be used to parse the incoming data and assign the data from the experimental units to particular data sets, for example for using clustering when computing the means and confidence intervals, or to construct and update data sets that are particular to implementing controls where there are specific latent variable values.

The knowledge of grid response to control actions may be used to improve grid control decisions continuously and in real-time to drive the objective value. This can be done in the context of adaptive experimentation or weighted randomization to balance exploration and exploitation of the search space of grid controls to select grid controls whose responses drive grid objectives, or they can be used by separate exploit routines that seek to maximize an objective function through selecting controls based on computations of the effects of the grid controls on grid conditions; this can be done directly using knowledge stored in the database in terms of objective function outputs, or current grid conditions and the effects of the grid control on grid parameters may be used to estimate the grid parameters that will result from applying a control and from those estimated parameters, objective function outputs calculated and the control promoting the best (in most examples, highest) objective value selected and applied to the grid.

Optionally, causal knowledge of grid element performance can be used for capital planning and integration of new elements into the grid. For grid elements that alter grid parameters and offer new controls that may be automatically controlled according to example embodiments of this invention, expected impacts of grid element performance can be computed based on grid operational data developed during past installations and integrations by application of methods and/or systems of the invention. This data may be developed by, for example, using trials of varying control states for a photovoltaic inverter already installed on an electrical grid to determine the impact of the installed inverter on grid parameters such as impacts of the inverters on power quality and demand satisfaction, then combining that knowledge with grid conditions detected at a proposed location for an analogous inverter that may be installed at the proposed location to predict the effects of installing an inverter at the proposed location.

Information derived from these experiments may be applied to reducing the number of faults on the grid over time by discovering pre-fault metrics, which may be derived through, for example, pattern-matching, Bayesian Causal Networks, Markov Chain Modeling, and/or Principal Component Analysis applied to aggregated grid sensor and control data from periods surrounding the occurrence of faults, and incorporating those pre-fault metrics into objective functions used to select particular grid control actions during opportunities to vary. Those objective functions may, for example, include terms that assign value to remaining outside the identified pre-fault metrics, for example potentially causing an ordinarily less optimal combination of control states to be selected over an ordinarily more optimal combination of control states when the latter combination of control states may produce stress on the grid that is associated with a higher incidence of faults. The pre-fault metrics may be grid parameters such as, for example, line temperature, line sag, or power quality on electrical grids, pressure on gas grids, or flow rates on water grids.

Knowledge derived through this method or other examples of this invention can be applied in incident response on the utility grid, to automatically attempt to mitigate the effects of events such as storm damage on the grid. The known effects of control states and/or combinations of those control states may include particular localized grid condition effects such as reducing power, water or gas flow through certain areas. While this may ordinarily impair utility service metrics such as meeting demand or hitting consumption goals, the system can switch to apply alternative objective functions or terms in objective functions in response to the detection of situations such as leaks on water or gas lines, or faults or downed lines on electrical grids and adjust the values of grid parameters to value isolation of the affected area and select grid controls and combinations of grid controls from the search space that accomplish this alternative objective. The affected areas and times may be indicated by input from human grid operators, or automatically detected by sensor and grid intelligence systems according to classifiers indicating that particular sensor responses are indicative of grid faults, leaks or damage requiring isolation. Optionally, the classifiers may be developed through machine learning, or experimental data collection. In some examples, changes in the relationships and deviations from expected behavior among grid elements indicate the presence and possibly the nature and location of faults along the grid. For an example of using deviations from expected response behavior to identify and categorize faults, on an electrical grid, where segments of the grid that used to be independent of one another now demonstrate correlated responses to changes in controls affecting one another, the appearance of this correlation may be indicative of a short circuit between those segments of the grid.

Figure 2:
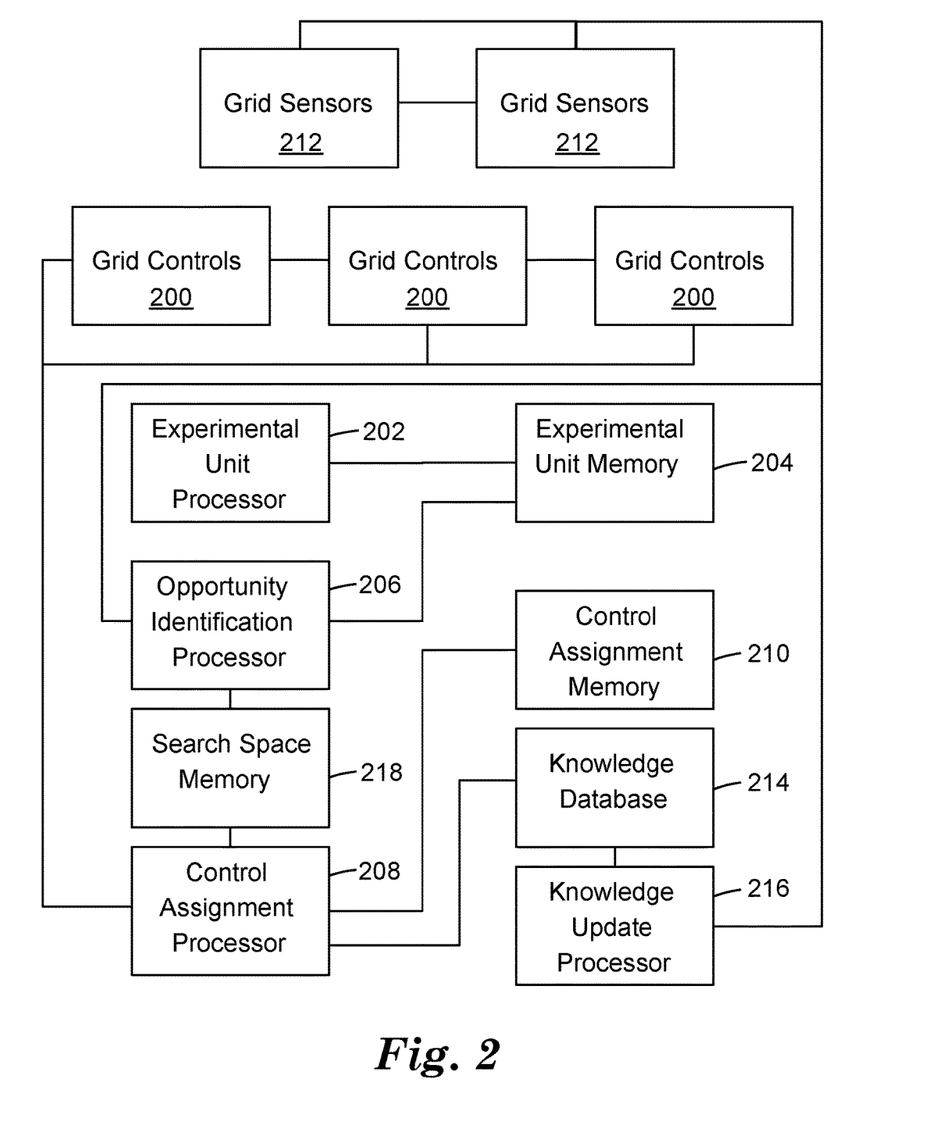
FIG. 2 is a system diagram of an example system for determining the effectiveness of grid actions and automatically selecting effective grid actions.

FIG. 2 is a system diagram for an example embodiment of the invention. Memories may be known computer storage means such as flash memory, hard disk drives using magnetic media, or other methods for data storage that can store the data and be accessed frequently and regularly. Processors may be configured to make the calculations through software instructions. Connections among the components may be hard-wired, use of common processors for multiple steps, or networked through wired or wireless means such as the various 802.11 protocols, ZigBee or Bluetooth standards, Ethernet, or other known means for transmitting data among the separate sensors, processors, memories and modules. The sensors, memories, processors, and modules may be distributed across locations, including at the sensors themselves, or co-located in intermediate or central locations.

Grid Controls 200 are controllable elements of the grid that act on the grid to produce a change in the grid and can be controlled automatically by the system. These may include, for example, on electrical grids, switches, controllable power storage devices, inverters and power conditioners, on water grids they may include, for example, valves, switches, pumps, and treatment facilities, and on gas grids they may include, for example, sources, valves and switches. These controls are networked with the rest of the system, which directs the particular states of these controls to explore and exploit their impact on the various grid parameters that are affected by those controls, such as, for some examples, available power, power quality, current, voltage, and/or line sag on electrical grids, pressure, leaks and demand satisfaction on gas grids, or leaks, demand service and water purity on water grids.

Experimental Unit Processor 202 is a processor configured to compute the duration of clearout and data recording periods and the areas of observation and buffering for changes to grid controls. Processors may be configured to compute these durations and areas through one or more of several approaches. One example approach for computing the durations and areas is by transforming received data on previously observed lagging effects of grid controls and converting that into the durations and areas, through analysis of that data to determine confidence intervals (such as the 95% or 99% confidence intervals) of the areas and times within which effects of a grid control are observed following its manipulation. Another example approach for computing the durations and areas is by using a model of grid response to simulate and predict likely lagging effects. Another example approach for computing the durations and areas is by generating data where the periods and areas are themselves used as independent variables during experimentation on the effects of changes in grid controls on grid parameters, for example, running trials with both 40-minute and 1-hour clearout periods for the same set of grid control decisions, with differences in the observed effects indicating when thresholds have been crossed from clean data to confounded data, and using those thresholds as the areas and durations for clearout and data recording that may be associated with particular changes to grid controls.

Experimental Unit Memory 204 is a memory configured to receive and store the experimental unit data computed by the experimental unit processor 202, the experimental unit data then used to identify opportunities to vary grid controls and determine areas and times at which to collect data associated with particular grid control decisions. The experimental unit data is the durations and areas for clearout and observation for a particular change to grid controls, computed to account for the lagging effects that result from many changes to grid control states and ensure observation of such lagging effects on the grid parameters, and the need to prevent such effects from confounding subsequent trials of differing grid control states when determining the effects of grid controls on the grid parameters.

Opportunity Identification Processor 206 is a processor configured to compute the possibility to vary grid controls 200 at particular places and times based on the experimental unit data from the Experimental Unit Memory 204, the conditions of the various grid parameters detected by the Grid Sensors 212, and the search space stored in Search Space Memory 218. An example of computing the search space may be identifying parts of the grid that may be available at a particular time because those areas, at the time, are not within the recording or clearout periods defined by the experimental unit definitions stored in Experimental Unit Memory 204 for other grid control selection decisions which are stored in Control Assignment Memory 210, then for those available times and locations, taking the current state of the grid detected by the Grid Sensors 212, identifying available grid control states within the search space stored in Search Space Memory 218, and determining how many possible members of the search space currently have overlapping confidence intervals regarding the effectiveness of those control states in promoting an objective based on grid parameters. Where there is more than one potential control state with overlapping confidence intervals, the Control Assignment Processor 208 is used to select the control state to be implemented on the Grid Controls 200.

Control Assignment Processor 208 determines selections among possible alternative sets of control states for opportunities identified by Opportunity Identification Processor 206. The control assignment processor is configured to make selections in one or more of the following ways: purely stochastic, where the selection of the control states is randomized among the members of the search space that can be assigned to the detected opportunity, or the selection may be constrained or weighted to balance exploration and exploitation or implement adaptive experimentation. An example of this is probability matching, where the point estimates and confidence intervals relating to the output value of an objective function for a particular point in the search space are used to compute the likelihood that that point in the search space will yield the highest output of the objective, and the selection is randomized to match those computed likelihoods, for example, where three members of the search space can be assigned to an opportunity, and the control states have a 65%, 25%, and 10% chance, respectively, of providing the highest objective output, those states will respectively be assigned 65%, 25% and 10% chances of being selected for that particular opportunity, allowing the potential for any of those control states to refine their point estimates and confidence intervals by conducting another trial of that control state, while the weighting makes it more likely to assign a control state that is likely to provide the best outcome on the objective function. The processor may be configured to possibly apply multiple approaches, and selects the approach based on the level of knowledge, for example requiring a threshold tightness of confidence intervals or minimum difference in likelihood of maximizing the objective to switch from applying a purely stochastic mode to applying a constrained or weighted approach to selecting grid control states for a particular identified opportunity.

Control Assignment Memory 210 stores the sets of control states selected for implementation on the grid, and optionally the time at which those control states will be implemented, as well as the location of that change to the grid controls if it is not already inherently included in the control state information. This data is computed by the Control Assignment Processor 208, and used to direct the Grid Controls 200, and is also used by the Knowledge Update Processor 216 to identify the segments of the data that occur within data recording areas and periods can be associated with particular grid control states to update the Knowledge Database 214 to refine the point estimates and confidence intervals surrounding the impact of that control state on the grid parameters.

Grid Sensors 212 are sensors connected to the utility grid to measure grid parameter metrics of interest, for example on electrical power grids, current, voltage, line temperature and/or line sag, for examples on water grids, sensors monitoring flow rates and/or water purity, and for examples on gas grids, pressure, flow rates, and/or presence and intensity of leaks and gas outside of the lines.

Knowledge Database 214 stores the data concerning grid responses to control states selected and implemented by the system. The data may be stored as point estimates of control impact and confidence intervals for those point estimates based on power analysis of the number of trials conducted, with point estimates and confidence intervals kept for each point that represents a combination of states of grid controls 200. The point estimates and confidence intervals are based on readings from the Grid Sensors 212 that occur during the recording periods when the particular grid control states are assigned to an identified opportunity, and are updated as new readings are made, the updating being done by the Knowledge Update Processor 216.

Knowledge Update Processor 216 receives data from the Grid Sensors 212, the experimental unit definitions from the Experimental Unit Memory 204, and the control assignments that were implemented on the Grid Controls 200 from the Control Assignment Memory 210, plus the current knowledge of control effects from the Knowledge Database 218. The knowledge update processor is configured to use that information to compute updated data on the effects of grid controls based on the data from the Grid Sensors 212 that is associated with those grid controls. For example, where the grid knowledge is kept as point estimates with surrounding confidence intervals, point estimates are updated by adding the data that was collected during a collection period at the Grid Sensors during the collection period determined by the Experimental Unit Processor 202 as a sample to the existing set of samples, and computing the mean value based on adding that new trial to the database of previous trials. Confidence intervals for the updated point estimate are computed and the confidence interval value associated with the point estimate is updated to reflect the addition of the new trial.

Search Space Memory 218 is a memory configured to receive and store search space information. The search space is the potential variations of the grid controls that are available to the system for trials and exploitation of knowledge resulting from trials to improve grid parameters or an objective function based on the grid parameters. For example, search space information may be stored as a matrix defining a multidimensional space, where there is a dimension corresponding to each control, that dimension having a finite set of points representing the different possible states or ranges of states for that control. Within this example, dimensions may also be combined or collapsed to reduce dimensionality and complexity, where the dimensions can either be combined, or may be placed outside the control of the system.

Figure 3:
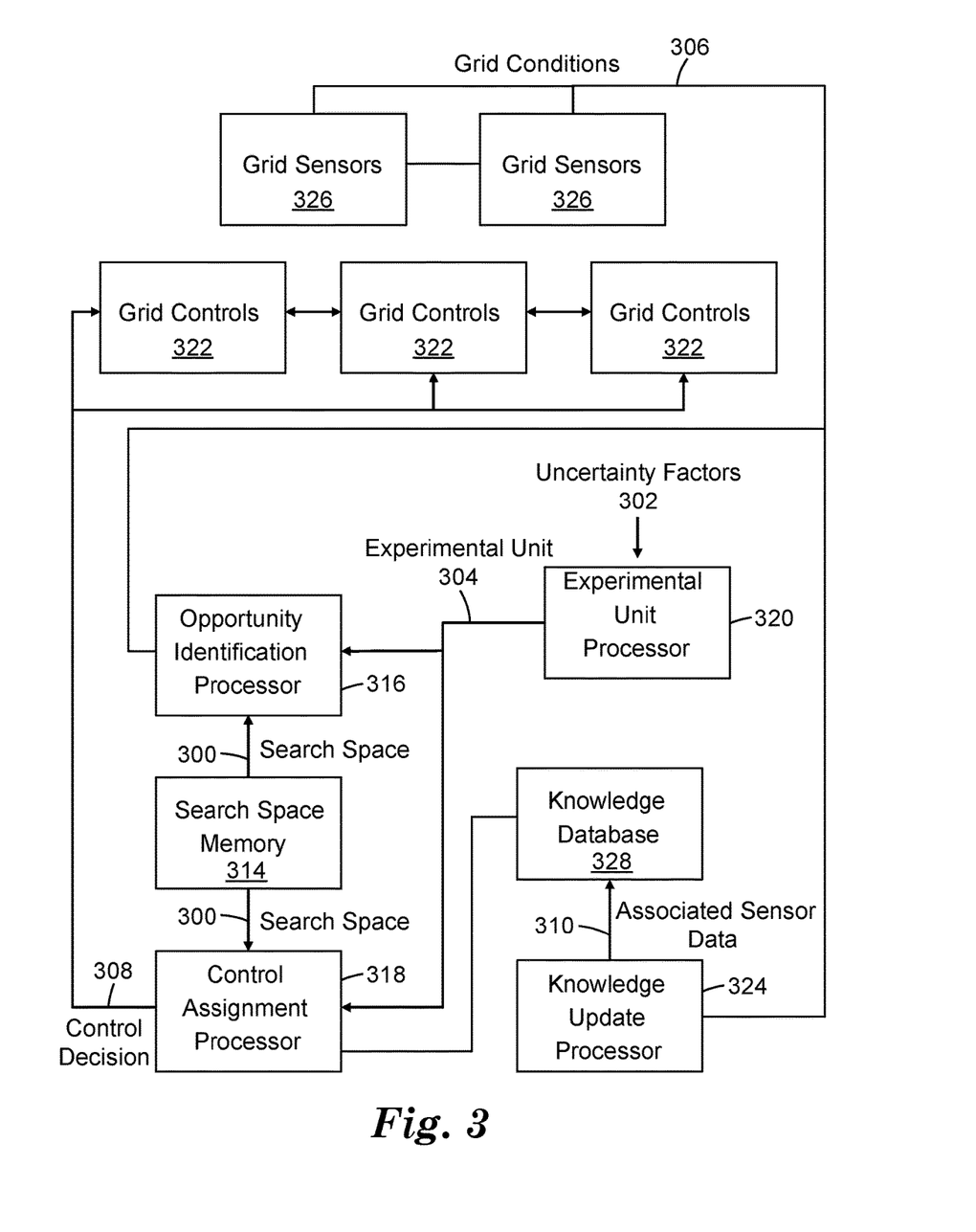
FIG. 3 is a data flow diagram charting the flow of information among components of an example system embodiment of the invention.

FIG. 3 is a data flow diagram showing the exchange of information among the components of an embodiment of the invention. The key data types used in this example are the Search Space 300, the Spatial and Temporal Uncertainty Factors 302, the Experimental Units 304, the Grid Conditions 306, the Control Decisions 308, Associated Sensor Data 310, and Knowledge of Control Effects 312.

Search Space 300 is the definition of the control states and/or combinations of control states that may be selected and implemented on the grid in examples of this invention. The search space may be a multidimensional space where dimensions represent grid controls available for control by examples of this invention, and where a finite number of points within each dimension represent the possible states of that control, or ranges of states for that control where controls are continuous. The Search Space 300 is stored in Search Space Memory 314, and is transferred to the Opportunity Identification Processor 316 and the Control Selection Processor 318.

Spatial and Temporal Uncertainty Factors 302 are data representative of the time and space over which grid responses may be expected for particular changes to grid control states. The spatial and temporal uncertainty factors may be computed from input data, derived from historical operational data, or determined through experiments observing changes to data based on changing the uncertainty periods and areas as independent variables in experimental trials. The Spatial and Temporal Uncertainty Factors 302 are received by the Experimental Unit Processor 320 and used to determine the Experimental Units 304 that determine the data collection and clearout periods and areas for various selections of grid Control Decisions 308.

Experimental Units 304 are determined by the Experimental Unit Processor 320 based on the Spatial and Temporal Uncertainty Factors 302. The experimental units are durations of time and areas of space over which the effects of grid controls may be observed, and where those effects may confound other trials of the effectiveness of grid controls. The Experimental Units 304 are transferred from the Experimental Unit Processor 320 to the Opportunity Identification Processor 316 to be used in computing the existence of an opportunity to vary Grid Controls 322 by determining whether or not a particular time and location may be confounded by other trials, and by the Knowledge Update Processor 324 to associate data collected at particular times and locations with particular grid control states that were selected and implemented.

Grid Conditions 306 are the current state of grid parameters of interest, determined by Grid Sensors 326. They are transferred to the Knowledge Update Processor 324 for use in updating grid knowledge by associating the data with particular grid controls and using the Associated Sensor Data 310 to update a Knowledge Database 326, may be used by the Opportunity Identification Processor 316 to determine if there is an opportunity to select among multiple potentially objective-maximizing possible control states, and may be used by the Control Selection Processor 318 to determine constraints or weighting that influence the likelihood that a particular control state or combination of control states is selected as the Control Decision 308.

Control Decisions 308 are selected by the Control Selection Processor 318 for each identified opportunity, by selecting among the possible control states existing within the Search Space 300 for that opportunity. The Control Decisions 308 may be made stochastically among the potential controls, or they may be made with weighting or constraints to also drive an objective while providing randomization or conduct adaptive experimentation. The Control Decisions 308 that are made by the Control Selection Processor 318 are provided to Grid Controls 322 to drive those controls to the states directed by the Control Decision 308 and affect the operations of the grid.

Associated Sensor Data 310 is computed from Grid Conditions 306 in the Knowledge Update Processor 324, by using the Experimental Units 304 and the Control Decisions 308 to assign, based on the time and location of the particular Grid Condition 306 data points, those data points to the particular control states that were influencing that particular time and location, and ensuring that data from that time and location was not confounded by other control state changes happening in spatial and temporal proximity to the data recording, allowing the Knowledge Update Processor 324 to update the Knowledge Database 330 with particularity regarding the control state that gave rise to that data point.

Knowledge of Control Effects 312 is stored in the Knowledge Database 330 and transferred to and from the Knowledge Update Processor 324 to be updated iteratively as new data points of Associated Sensor Data 310 are created by selecting control states and collecting the Grid Conditions 306 during the times and locations affected by the selected control states. The Knowledge of Control Effects may be stored as a point estimate and surrounding confidence interval for each grid parameter affected by a particular control state or combination of control states. The point estimates may be means of the collected data points, with confidence intervals for those means established through experimental power analysis based on the number of samples used in computing the mean. Optionally, the Knowledge of Control Effects may be in terms of the grid parameters themselves, or they may be kept in terms of an objective metric based on a composite of multiple grid parameters, all weighted and combined through an objective function; this may include a non-linear or bounded function with respect to some or all of the grid parameters included, for example where there are sharp non-linearities in the effects of particular grid parameters such as pressure or power quality that are acceptable within a range but unacceptable once they cross a particular threshold.

In addition to direct, automated control of grid actions, some example systems and methods of the invention may be configured to experiment on and optimize the in human-in-the-loop processes such as grid maintenance and repair, dispatching assets to particular detected grid conditions and establishing priorities and critical periods to address particular grid conditions such as leaks, faults, or aging equipment. In these examples, the grid actions are not direct automated control of grid assets, but automated controls of dispatching or resource assignment tools which communicate queue orders and priorities which direct grid resources, including both personnel and particular tools, replacement parts, and/or maintenance and repair capabilities to points along the grid.

In the examples directed to human-in-the-loop actions, the responses are indexed by creating a space corresponding to the detected potential pathologies, which may be identified by characterizing and/or classifying grid sensor data to correspond with the likelihood of certain faults, leaks, or other events requiring the assignment of grid maintenance resources, with those dimensions including points for particular response periods during which the detected event should be responded to with various maintenance resources, and in some examples, a point representing a "do nothing" option of not responding to the detected event.

Figure 4:
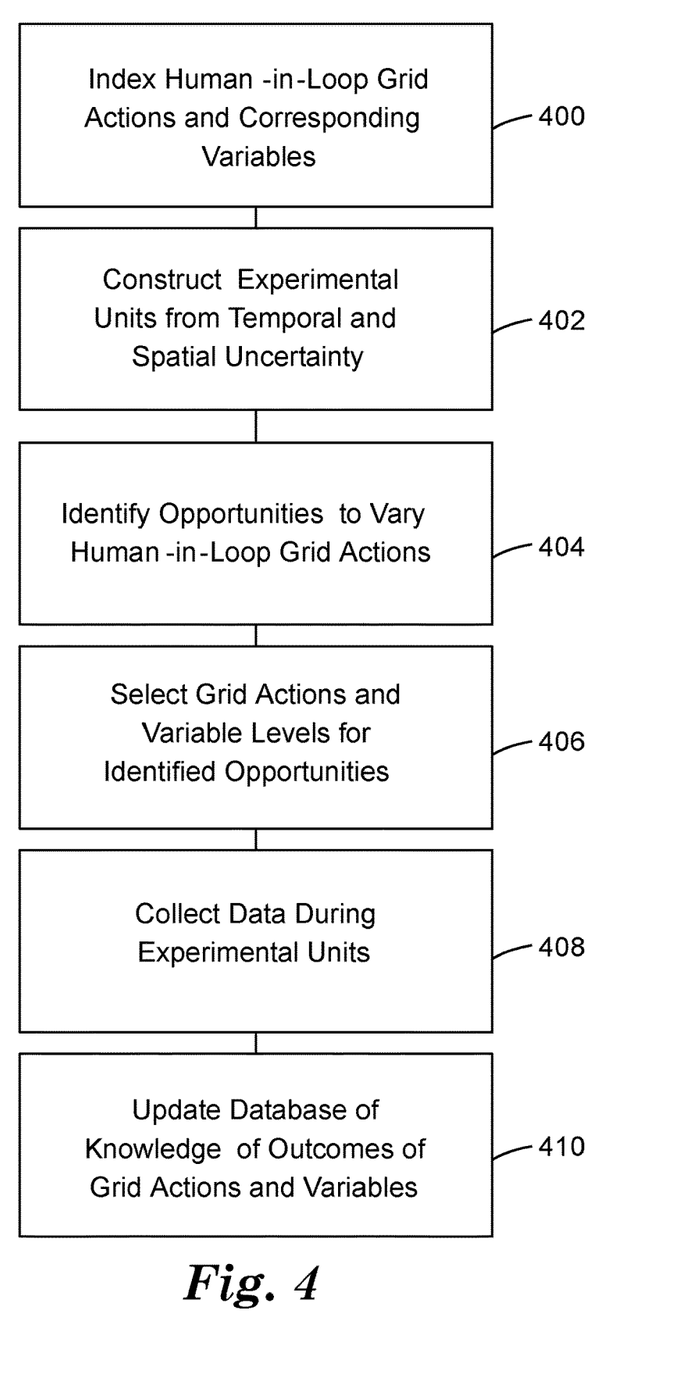
FIG. 4 is a flowchart of a method for determining the effectiveness of grid actions requiring a human in the loop and selecting effective human-in-the-loop grid actions.

FIG. 4 is a flowchart detailing the steps for determining queuing rules for human-in-the-loop grid actions through automated experimentation, by indexing possible actions, generating experimental units within which varying delay periods may be tested, identifying opportunities to vary delay times associated with those possible actions, measuring the outcomes, associating outcomes with particular delays, and using the outcomes associated with particular delays to create and/or update queuing rules.

An index of grid actions and corresponding variables is generated in step 400. The grid actions are, in this embodiment, human-in-the-loop actions that may be automatically scheduled or coordinated, and carried out by automatically distributing machine-generated queues or orders to personnel indicating when and/or in what order to carry out particular actions at points along the grid. These grid actions may be associated with particular grid incidents, such as, for example, particular grid parameters that are indicative of faults, component wear or failure, and/or leaks, or grid components hitting particular age or usage thresholds. Each grid action has a number of corresponding variables which are associated with it, which may be represented as a dimension and, optionally, sub-dimensions in the index. The dimension includes a discrete number of ranges of time from the detection of an incident to the application of the action to that incident, and may also include a "do nothing" option where the action may not be applied. There may be sub-dimensions corresponding to the action such as the severity of the grid incident being responded to, particular resources being directed to carry out the action, or the day-part in which the action is ultimately applied to the grid by the automatically queued resources, or other such sub-variables which may be controlled and influence the effectiveness of the grid action.

Experimental units are constructed in step 402 based on spatial and temporal uncertainties surrounding the action. Temporal and spatial uncertainties, and optionally other variables, for example the particular grid incident types associated with these grid actions or the grid parameters affected during the application of such grid actions, associated with the indexed grid actions are received and used to determine periods of time and areas of space during which grid actions would confound received data with respect to one another's effects on the grid. For human-in-the-loop actions such as equipment replacements or repairs, long temporal uncertainties may be required to collect data regarding long-term outcomes associated with particular decisions.

As with automated direct control grid actions, temporal and spatial uncertainties may themselves be derived through experimentation, by holding actions constant for identified opportunities, but varying the uncertainties used to direct the exclusion of possible confounds and/or determine the boundaries within which data is associated with a particular grid action to determine its effect on grid behavior.

Opportunities to vary a human-in-the-loop grid action are identified in step 404. Opportunities to select a human-in-the-loop grid action may be defined by receiving sensor measurements of grid parameters and applying classifiers to or analyzing those measurements to identify grid incidents, or by receiving notifications from grid elements relating to their age or wear conditions, or other communications that indicate the existence of a grid incident such as input by a human operator. Classifiers used to determine grid incidents from grid parameter measurements may classify the severity as well as the existence of the particular grid incident indicated by the sensor data. Grid actions responsive to that incident, for example, dispatching a maintenance crew to examine a faulty local transformer on an electrical grid, or to dispatch a maintenance crew to a leak of a particular severity classification. Current experimental units are also used in identifying opportunities to vary human-in-the-loop grid actions. Ongoing experimental units create areas of space and periods of time within which opportunities may not exist or may be constrained in terms of what trials may be conducted to eliminate the possibility of new and ongoing trials confounding one another. Ongoing experimental units may prevent detected incidents from being classified as opportunities to vary human-in-the-loop grid actions, or may constrain the subsequent assignment of grid actions and associated variables and sub-variables to an identified opportunity. Constraints created by experimental units around a detected incident may be associated with the identified opportunity, for example as metadata attached to the opportunity identification, which influences the possibilities for assignment in step 406.

Human-in-the-loop grid actions are assigned to identified opportunities in step 406. This assignment may include selection of the grid action, a time period within which the grid action is to be executed, and the particular associated sub-variables with that action to the opportunity. The selection creates a trial according to an experimental design. Experimental designs may include, for example, randomized trials, Latin Square and Partial Latin Square designs, adaptive designs or matched-control studies. The selection for an individual opportunity is made through randomization which may be constrained based on the needs of the experimental design, the past samples, and/or predictions of the outcome based on current experimental data regarding outcomes of grid actions, associated variables, and/or sub-variables.

Constraints associated with the opportunity may be used to restrict the possible variations that may be selected for the opportunity. The constraints are received, for example as metadata associated with the identified opportunity. The constraints may restrict the possible variations by, for example, eliminating one set of potential responses to an incident due where that set of potential responses would confound the trial of an ongoing experimental unit whose spatial and temporal uncertainties overlap those of the opportunity, or may restrict confounding among particular associated variables or sub-variables by excluding from selection grid actions that affect the associated variables or sub-variables being tested in the potentially overlapping ongoing experimental units.

Selection may be based on the severity of an incident as well as the type of incident and incidents of similar type but varying severity may be treated very differently during the selection process. Classifiers used to identify incidents from sensor data may include multiple or tiered classifiers for a particular type of event, for example leaks on a gas or water grid, with the ability to determine a severity level for the incident. The severity level may be in terms of an existing human-developed risk classification structure, such as Category 1, 2, and 3 leaks on a gas grid. Each severity level classification may be treated as a different grid action with its own range of response times to test and may have its own constraints on allowable ranges of response times in which to address that particular category or severity of grid incident.

The experimental design may be an adaptive design and/or may balance the exploration of the effectiveness of different variables with exploiting current data on the effectiveness of those variables by constraining the randomization based on the likely outcome of each possible selection. This may be done, for example, through probability matching, where the current means and confidence intervals for grid parameters or objective function outputs for particular possible selections for an opportunity are compared. Where grid parameters are the data used, those means and confidence intervals are input into an objective function to determine a range of values that may be expected for that particular selection of grid action and optional associated variables and sub-variables. The overlap of confidence intervals and value of the means for each selection are used to compute the likelihood that each produces the highest objective function output value, and that likelihood for each potential selection is used as the likelihood that the particular selection is the one selected for and assigned to the opportunity.

The selected human-in-the-loop grid action is assigned to a queue order and distributed to the grid maintenance resources and personnel. The queue order is constructed according to the selected grid actions and the time periods within which they must be implemented, assigning each selected action in an order. The time and location of each action is used to compute the time periods within which that action and subsequent actions following it in a queue will be carried out, and those times used to create a queue order that directs the completion of the selected grid actions at times consistent with the selected time periods. Creation of the queue order from the selected grid actions, time periods, and optionally, associated variables and sub-variables may also be constrained by human-defined risk-equivalent strata for the incidents, which may be human-generated, for example through human interface with an expert system, and stored in a database. For example, on a gas grid, there may be four strata, for Category 1 leaks, Category 2 leaks, Category 3 leaks, and investigating abnormal pressure variations. In those cases, the strata for Category 1 leaks may take complete priority over the other strata, ensuring any action addressing incident classified as a Category 1 leak is placed in the queue order ahead of selected actions addressing all other strata, ensuring resources are dispatched to incidents and grid actions queued according to the strata which may mitigate risks of variation in queuing the actions and varying response times and orders.

This queue order is distributed to grid maintenance personnel through automated electronic communications means such as, for example, emails or text messages, or messages within dispatching applications or tools. Distribution may be continuous, as incidents occur, or at regular intervals, a current version of the queue order is distributed.

Data on the effectiveness of the selected human-in-the-loop grid action is collected in step 408. Data is collected by grid sensors measuring one or more grid parameters. Data is collected by these sensors at least within the experimental unit defined for a particular grid action, and associated with that grid action and its accompanying variables, such as the time from detection of the incident to the actual application of the human-in-the-loop grid action and sub-variables such as the severity of the detected incident, or the particular resources dispatched to the incident to carry out the action. Outcome data may be the collected grid parameter data itself, for example power quality data from an electrical grid, or the output of an objective function using the grid parameter data to compute an effectiveness metric for the outcome of the human-in-the-loop grid action, for example on an electric grid through a function that computes a weighted objective value based on multiple grid parameters, for example improvements in power quality, levels of available power, and the time between detected faults on an electrical grid.

A database of intervention effectiveness data is updated in step 410. Data is associated with particular individual grid actions through the experimental unit within which the data is collected. Based on the grid action, and knowledge of the selected levels of the variables and any sub-variables from the application of that human-in-the-loop grid action to the identified opportunity are known and the collected data associated with a particular grid action can be added as a sample to the outcome data sets for the variables and, optionally, sub-variables of that particular grid action, including, for example, the time frame in which the action is implemented in response to a detected grid incident, for the particular severity classification of the incident based on the classifiers and the data indicating the incident. These updates are performed by updating means and confidence intervals of the data sets for each corresponding variable and sub-variable, by adding the new sample to the data set for each and re-calculating the means based on that data, and re-calculating confidence intervals around those means based the sample size of the data after adding this new sample. This database may be further improved and exploited through additional iterations of this example method, through the selection step 406.

What is claimed is:

1. A computer-implemented method, comprising:
   receiving an opportunity to vary a control on a utility grid comprising a plurality of possible grid control actions;
   receiving effectiveness data for the possible grid control actions comprising confidence intervals around the effects of each possible grid control action;
   selecting a grid control action, using a processor, based on the overlap in confidence intervals of the effectiveness data; and
   implementing the selected grid control action on the utility grid,
   further comprising determining an opportunity to vary a control on a utility grid by referencing current states of the controls on the utility grid and a multidimensional space representing possible grid control actions.

2. A computer-implemented method, comprising:
   receiving an opportunity to vary a control on a utility grid comprising a plurality of possible grid control actions;
   receiving effectiveness data for the possible grid control actions comprising confidence intervals around the effects of each possible grid control action;
   selecting a grid control action, using a processor, based on the overlap in confidence intervals of the effectiveness data; and
   implementing the selected grid control action on the utility grid,
   wherein the possible grid control actions are defined by a constrained multidimensional space, the points in the constrained space representing the ordinary operational envelope of the utility grid.

3. A computer-implemented method, comprising:
   receiving an opportunity to vary a control on a utility grid comprising a plurality of possible grid control actions;
   receiving effectiveness data for the possible grid control actions comprising confidence intervals around the effects of each possible grid control action;
   selecting a grid control action, using a processor, based on the overlap in confidence intervals of the effectiveness data; and
   implementing the selected grid control action on the utility grid,
   further comprising:
   collecting data on utility grid parameters; and
   parsing the collected data based at least in part on a spatial reach of the grid control action and a temporal reach of the grid control action.

4. The computer-implemented method of claim 3, further comprising adding data that is within both the temporal reach of the grid control action and the spatial reach of the grid control action to a database configured to store the effectiveness data.

5. The computer-implemented method of claim 3, wherein the spatial reach of the grid control action and the temporal reach of the grid control action are computed using a model of the utility grid.

6. The computer-implemented method of claim 3, wherein the spatial reach of the grid control action and the temporal reach of the grid control action are selected from within confidence intervals derived from the impact of the grid control action on grid response to a second grid control action taken in temporal or spatial proximity to the grid control action.

7. A computer-implemented method, comprising:
   receiving an opportunity to vary a control on a utility grid comprising a plurality of possible grid control actions;
   receiving effectiveness data for the possible grid control actions comprising confidence intervals around the effects of each possible grid control action;
   selecting a grid control action, using a processor, based on the overlap in confidence intervals of the effectiveness data; and
   implementing the selected grid control action on the utility grid,
   wherein the selection of the grid control action is randomized and wherein the randomization is weighted based on the overlap in confidence intervals around the effects.

8. A computer-implemented method, comprising:
   receiving an opportunity to vary a control on a utility grid comprising a plurality of possible grid control actions;
   receiving effectiveness data for the possible grid control actions comprising confidence intervals around the effects of each possible grid control action;
   selecting a grid control action, using a processor, based on the overlap in confidence intervals of the effectiveness data; and
   implementing the selected grid control action on the utility grid,
   wherein the selection of the grid control action is a selection of at least one of the following: a response to excavation near gas pipelines; a switch state for a capacitor bank or the position of a load tap hanger; and a time delay before taking a scheduled action.

9. A computer-implemented method, comprising:
   receiving an opportunity to vary a control on a utility grid comprising a plurality of possible grid control actions;
   receiving effectiveness data for the possible grid control actions comprising confidence intervals around the effects of each possible grid control action;
   selecting a grid control action, using a processor, based on the overlap in confidence intervals of the effectiveness data; and
   implementing the selected grid control action on the utility grid,
   wherein the effectiveness data comprises a risk of pipeline damage from an excavation.

10. A system for automatically selecting grid control actions, comprising:
    utility grid controls,
    a search space memory configured to store a search space of utility grid control states;
    a knowledge database configured to store effectiveness data comprising confidence intervals around the effects of the utility grid control states; and
    a control assignment processor configured to select utility grid control states based on the effectiveness data,
    wherein the grid controls are at least one of the following: dispatching and messaging systems for responding to excavation near pipelines; and capacitor banks and load tap changers.

* * * * *